US008972329B2

(12) United States Patent
Constantine et al.

(10) Patent No.: US 8,972,329 B2
(45) Date of Patent: Mar. 3, 2015

(54) SYSTEMS AND METHODS FOR RANKING NODES OF A GRAPH USING RANDOM PARAMETERS

(75) Inventors: Paul Constantine, Stanford, CA (US); David Gleich, Stanford, CA (US)

(73) Assignee: The Board of Trustees of the Leland Stanford Junior University, Palo Alto, CA (US)

(*) Notice: Subject to any disclaimer, the term of this patent is extended or adjusted under 35 U.S.C. 154(b) by 1206 days.

(21) Appl. No.: 12/435,244

(22) Filed: May 4, 2009

(65) Prior Publication Data

US 2009/0276389 A1 Nov. 5, 2009

Related U.S. Application Data

(60) Provisional application No. 61/050,109, filed on May 2, 2008, provisional application No. 61/050,431, filed on May 5, 2008.

(51) Int. Cl.
*G06F 9/44* (2006.01)
*G06N 7/02* (2006.01)
*G06N 7/06* (2006.01)
*G06N 7/00* (2006.01)

(52) U.S. Cl.
CPC ........................ *G06N 7/005* (2013.01)
USPC ........................................................ 706/52

(58) Field of Classification Search
None
See application file for complete search history.

(56) References Cited

U.S. PATENT DOCUMENTS

| 6,272,507 B1* | 8/2001 | Pirolli et al. ................. 715/206 |
| 7,089,252 B2* | 8/2006 | Tomlin et al. ........................ 1/1 |
| 7,216,123 B2 | 5/2007 | Kamvar et al. |
| 7,634,476 B2* | 12/2009 | Liu et al. ............................ 1/1 |
| 7,933,915 B2* | 4/2011 | Singh et al. ................... 707/760 |
| 7,991,755 B2* | 8/2011 | Chitrapura et al. ........... 707/706 |
| 8,010,482 B2* | 8/2011 | Andersen et al. ............... 706/62 |
| 2008/0010281 A1 | 1/2008 | Berkhin et al. |

OTHER PUBLICATIONS

Morrison, Julie; Breitling, Rainer; Higham, Desmond; Gilbert, David. "GeneRank: Using search engine technology for the analysis of microarray experiments." BMC Bioinformatics 6.233 (2005) 1-14.*
Roger B Nelsen, José Juan Quesada Molina, José Antonio Rodríguez Lallena, Manuel Úbeda Flores, Best-possible bounds on sets of bivariate distribution functions, Journal of Multivariate Analysis, vol. 90, Issue 2, Aug. 2004, pp. 348-358.*
Benczur, Andras; Csalogany, Karoly; Sarlos, Tamas; Uher, Mate. "SpamRank—Fully Automatic Link Spam Detection." Proceddings of the 1st International Workshop on Adversarial Informatin Retrieval on the Web. (2005).*
D. Gleich, P.W. Glynn, G.H. Golub, C. Greif, Three results on the PageRank vector: Eigenstructure, sensitivity, and the derivative, in: Web Information Retrieval and Linear Algebra Algorithms, 2007.*

(Continued)

*Primary Examiner* — Kakali Chaki
*Assistant Examiner* — Daniel Pellett
(74) *Attorney, Agent, or Firm* — Crawford Maunu PLLC

(57) ABSTRACT

A ranking approach is used to determine rank-based relationships. In connection with various embodiments, the present invention is directed to a method for ranking nodes of a graph. A vector is provided as a function of a set of random parameters, and a probability matrix function is used, relative to nodes of the graph, to assess the statistics of the vector that solves a probability-based system. Certain embodiments are directed to determining a page rank for a web-based search.

30 Claims, 5 Drawing Sheets

(56) References Cited

OTHER PUBLICATIONS

Langville, Amy N., Carl D. Meyer "Google's pagerank and beyond: The science of search engine rankings." (2006).*
Arasu, Arvind, et al. "PageRank computation and the structure of the web: Experiments and algorithms." Proceedings of the Eleventh International World Wide Web Conference, Poster Track. 2002.*
Langville, Amy N., and Carl D. Meyer. "A reordering for the PageRank problem." SIAM Journal on Scientific Computing 27.6 (2006): 2112-2120.*
Ipsen, Ilse CF, and Rebecca S. Wills. "Mathematical properties and analysis of Google's PageRank." Bol. Soc. Esp. Mat. Apl 34 (2006): 191-196.*
Bianchini, Monica, Marco Gori, and Franco Scarselli. "Inside pagerank." ACM Transactions on Internet Technology (TOIT) 5.1 (2005): 92-128.*
Gleich, David, Leonid Zhukov, and Pavel Berkhin. "Fast parallel PageRank: A linear system approach." Yahoo! Research Technical Report YRL-2004-038, available via http://research. yahoo. com/publication/YRL-2004-038. pdf 13 (2004): 22.*
Langville, Amy N., and Carl D. Meyer. "Deeper inside pagerank." Internet Mathematics 1.3 (2004): 335-380.*
Avrachenkov et al. "A singular perturbation approach for choosing PageRank damping factor." ArXiv:math.PR/0612079 v.1, p. 1-14 (Dec. 4, 2006).
Babuska et al. "Galerkin Finite Element Approximations of Stochastic Elliptic Partial Differential Equations." SIAM J. Numer. Anal. 42(2), p. 800-825 (2004).
Babuska et al. "A Stochastic Collocation Method for Elliptic Partial Differential Equations with Random Input Data." SIAM J. Numer. Anal. 45(3), p. 1005-1034 (2007).
Baeza-Yates et al. "Generalizing PageRank: Damping Functions for Link-Based Ranking Algorithms." SIGIR'06, ACM, p. 308-315 (Aug. 6-11, 2006).
Boldi. "TotalRank: Ranking Without Damping." International World Wide-Web Conference, p. 898-899 (May 10-14, 2005).
Brezinski et al. "The PageRank Vector: Properties, Computation, Approximation, and Acceleration." SIAM J. Matrix Anal. Appl. 28(2), p. 551-575 (2006).
Castillo et al. "A Reference Collection for Web Spam." WebSpam-UK2006, p. 1-14 (2006).
Farahat et al. "Authority Rankings from Hits, PageRank and Salsa: Existence, Uniqueness, and Effect of Initialization." SIAM J. Sci. Comput. 27(4), p. 1181-1201 (2006).
Frauenfelder et al. "Finite elements for elliptic problems with stochastic coefficients." Comput. Methods Appl. Mech. Engrg. 194, p. 205-228 (2005).
Freschi. "Protein function prediction from interaction networks using a random walk ranking algorithm." Proceedings of the 7th IEEE Conference on Bioinformatics and Bioengineer., p. 42-48 (Oct. 2007).
Ghanem et al. "Propagation of probabilistic uncertainty in complex physical systems using a stochastic finite element approach." Physica D 133, p. 137-144 (1999).
Gray et al. "An Inner/Outer Stationary Iteration for Computing PageRank." In *Web Information Retrieval and Linear Algebra Algorithms*, p. 1-15 (2007).
Golub et al. "An Arnoldi-Type Algorithm for Computing Page Rank." BIT Numerical Mathematics, 13 pgs. (2006).
Haveliwala. "Topic-Sensitive PageRank." WWW 2002, 10 pgs. (May 7-11, 2002).
Horn et aL "A General Setting for the Parametric Google Matrix." Internet Math 3(4), 20 pgs. (2006).
Jeh et al. "Scaling Personalized Web Search." WWW 2003, p. 1-35 ( May 20-24, 2003).
Kamvar et al. "Extrapolation Methods for Accelerating PageRank Computations." WWW 2003, p. 261-270 (May 20-24, 2003).
Katz. "A New Status Index Derived From Sociometric Analysis." Psychometrika 18(1), p. 39-43 (Mar. 1953).
Xiu et al. "High-Order Collocation Methods for Differential Equations with Random Inputs." SIAM J. Sci. Comput. 27(3), p. 1118-1139 (2005).
Xiu et al. "The Wiener-Askey Polynomial Chaos for Stochastic Differential Equations." SIAM J. Sci. Comput. 24(2), p. 619-644 (2002).

L. Page, S. Brin et al. *The PageRank citation ranking: Bringing order to the web*. Technical Report 1999-66, Stanford University (Nov. 1999).
S. Brin and L. Page. *The anatomy of a large-scale hypertextual Web search engine*. Proceedings of the seventh international conference on World Wide Web 7: 107-117, Section 2.1.1 (1998).
P. Berkhin. *A survey on PageRank computing*. Internet Mathematics, 2(1):73-120 (2005).
A. Langville and C. Meyer. *Google's PageRank and Beyond: The Science of Search Engine Rankings*, Princeton University Press (2006). Title and Table of Contents attached, 4 pgs.
L. Katz. *A new status index derived from sociometric analysis*. Psychometrika, 18(1):39-43 (Mar. 1953). p. 39 attached.
K. Avrachenkov et al. *Distribution of PageRank mass among principle components of the web*. In Proceedings of the 5th Workshop on Algorithms and Models for the Web Graph (WAW2007), vol. 4863 of Lecture Notes in Computer Science, pp. 16-28 (2007).
P. Chen et al. *Finding scientific gems with Google's PageRank algorithm*. Journal of Informetrics, 1(1), pp. 8-15 (Jan. 2007).
M. Najork et al. *Hits on the web: how does it compare?* In Proceedings of the 30th annual international ACM SIGIR Conf. on Research and Develop. in information retrieval (SIGIR2007), pp. 471-478, (2007).
B. Huberman et al. *Strong regularities in World Wide Web surfing*. Science, 280(5360):95-97 (1998).
P. Boldi et al. *Traps and pitfalls of topic-biased PageRank*. In WAW 2006 Fourth Workshop on Algorithms and Models for the Web-Graph, LNCS (2007).
A. Arasu et al. *PageRank computation and the structure of the web: Experiments and algorithms*. In Proceedings of the 11th international conference on the World Wide Web (2002).
G. Del Corso et al. *Fast PageRank computation via a sparse linear system*. Internet Mathematics, 2(3):251-273 (2005).
R. White and S. Drucker. *Investigating behavioral variability in web search*. In Proceedings of the 16th Int'l Conference on the World Wide Web (WWW2007) , pp. 21-30, (2007).
R. Andersen et al. *Local graph partitioning using PageRank vectors*. In Proceedings of the 47th Annual IEEE Symposium on Foundations of Computer Science, 20 pgs. (2006).
D. Zhou, J. Huang, and B. Schölkopf. *Learning from labeled and unlabeled data on a directed graph*. In ICML '05: Proceedings of the 22nd Int'l Conference on Machine Learning, pp. 1036-1043 (2005).
J. Morrison et al. *GeneRank: using search engine technology for the analysis of microarray experiments*. BMC Bioinformatics, 6(1):233, 14 pgs. (2005).
R. Singh et al. *Pairwise global alignment of protein interaction networks by matching neighborhood topology*. In Proceedings of the 11th Annual Int'l Conference on Research in Computational Molecular Biology (RECOMB), vol. 4453 of Lecture Notes in Computer Science, pp. 16-31 (2007). p. 16 only.
P. Boldi. *TotalRank: ranking without damping*. International World Wide Web Conference, pp. 898-899 (2005). Abstract only.
S. Asmussen and P. Glynn. *Stochastic Simulation: Algorithms and Analysis*. vol. 57 of Stochastic Modelling and Applied Probability, 476 pgs. (2007). Book Overview only, one page.
W. Gautschi. *Orthogonal Polynomials: Computation and Approximation*. Numerical Mathematics and Scientific Computation, 301 pgs. (2004). Book Overview only, one page.
V. Freschi. *Protein function prediction from interaction networks using a random walk ranking algorithm*. In Proceedings of the 7th IEEE International Conference on Bioinformatics and Bioengineering (BIBE 2007), pp. 42-48. IEEE (Oct. 2007). Abstract only.
P. Constantine et al. *Spectral Methods for Parameterized Matrix Equations*. Published by Cornell University at: eprint arXiv:0904. 2040, 18 pgs. (Apr. 2009).
P. Constantine and D. Gleich. *Using Polynomial Chaos to Compute the Influence of Multiple Random Surfers in the PageRank Model*. WAW 2007, LNCS 4863, pp. 82-95 (2007). Filed as Appendix B to U.S. Appl. No. 61/050,109 and U.S. Appl. No 61/050,431.
P. Constantine and D. Gleich. *Random Teleportation Parameters in the PageRank Model*. Filed as Appendix A to U.S. Appl. No. 61/050,109 and U.S. Appl. No. 61/050,431.

* cited by examiner (a) $\mathrm{E}\left[A^n - A^{n+1}\right]$ (b) $\mathrm{E}\left[A^n - A^{n+1}\right]$ for larger $n$ (c) Beta$(0, 0, 0.6, 0.9)$ (d) Beta$(2, 16, 0, 1)$ (e) Beta$(1, 1, 0.1, 0.9)$ (f) Beta$(-0.5, -0.5, 0.2, 0.7)$

SYSTEMS AND METHODS FOR RANKING NODES OF A GRAPH USING RANDOM PARAMETERS

RELATED DOCUMENTS

This patent document claims the benefit, under 35 U.S.C. §119(e), of U.S. Provisional Patent Application Ser. No. 61/050,109 filed on May 2, 2008, and entitled "Systems and Methods for Ranking Nodes of a Graph Using Random Parameters;" and of U.S. Provisional Patent Application Ser. No. 61/050,431 filed on May 5, 2008, and entitled "Systems and Methods for Ranking Nodes of a Graph Using Random Parameters;" these patent documents and the Appendices filed as part of these documents are fully incorporated herein by reference.

FIELD OF THE INVENTION

The present invention relates to systems and methods for ranking nodes of a graph, such as the non-limiting example of web pages resulting from a search engine query.

BACKGROUND

Search engines are commonly used to search large linked databases, such as the World Wide Web, for desired content and to sort the search results in a ranked fashion based on some measure of relevancy. Such a database can be represented as a directed graph of N nodes, where each node corresponds to a document and where the directed connections between nodes correspond to directed links from one document to another.

One approach to ranking is based on the intrinsic content of the documents or document links. Another approach is the page rank method, which determines a ranking from the link structure of the directed graph. In this approach, the rank of a web page is related to the probability that a web surfer ends up at the page after randomly following a large number of links. The page ranks for the database are calculated by finding the principal eigenvector of an N×N link matrix A, where each element $\alpha_{ij}$ of A represents a probability of moving from node i to node j of a directed graph of N nodes.

The principal eigenvector may be computed using the power method, an iterative procedure that calculates the steady-state probability vector x defined as the vector to which $x_n = A^n x_0$ converges as n grows very large, where $x_0$ is an initial N-dimensional vector. The rank $x_k$ for a node k is simply the $k^{th}$ component of the vector x. A singular value decomposition of A may be calculated to define the rank of a node as the corresponding component of the singular vector. The probabilities in the matrix A often depend on a parameter and a given distribution over pages and thus the page rank values depend on these quantities. The affect of both of these quantities on the mathematics of the page rank vector are fairly well understood, with α being selected as a single deterministic value.

SUMMARY

In accordance with certain embodiments, the present invention is directed to methods for ranking nodes of a graph, including providing a vector as a function of a set of random parameters (e.g., random variables), and using a probability matrix function relative to nodes of the graph to assess the statistics of the vector that solves a probability-based system. In particular embodiments, the steps involve modeling with the vector as a function of a random variable distributed according to user behavior for multiple users.

In accordance with certain embodiments, the present invention is further directed to computer-based arrangements or systems for implementing the disclosed methods. One such embodiment is directed to a computer-based system for ranking nodes of a graph. The system includes a computer circuit configured with software to provide a vector as a function of a set of random parameters, and further to use a probability matrix function relative to nodes of the graph to assess the statistics of the vector that solves a probability-based system.

In accordance with certain embodiments, the present invention is further directed to data storage media for storing computer executable code that, when executed by a computer, performs the steps of the disclosed methods, for storing results of the disclosed methods, and for storing parameters indicative of the random variables used in the disclosed methods.

Other example embodiments are directed to a method or system involving a ranking metric that uses a stochastic interpretation of random parameters driving the metric.

In other example embodiments, a method or system involves a comparison of ranking metrics that include a deterministic ranking metric and a ranking metric that uses a stochastic interpretation of random parameters driving the metric.

Still other example embodiments are directed to a method or system involving a ranking metric that uses a stochastic interpretation of random parameters driving the metric, as exemplified by or equivalent to any of the embodiments/applications disclosed herein.

The above overview is not intended to describe each illustrated embodiment or every implementation of the present invention.

BRIEF DESCRIPTION OF THE DRAWINGS

The invention may be more completely understood in consideration of the detailed description of various embodiments of the invention that follows in connection with the accompanying drawings as follows.

Figure 1:
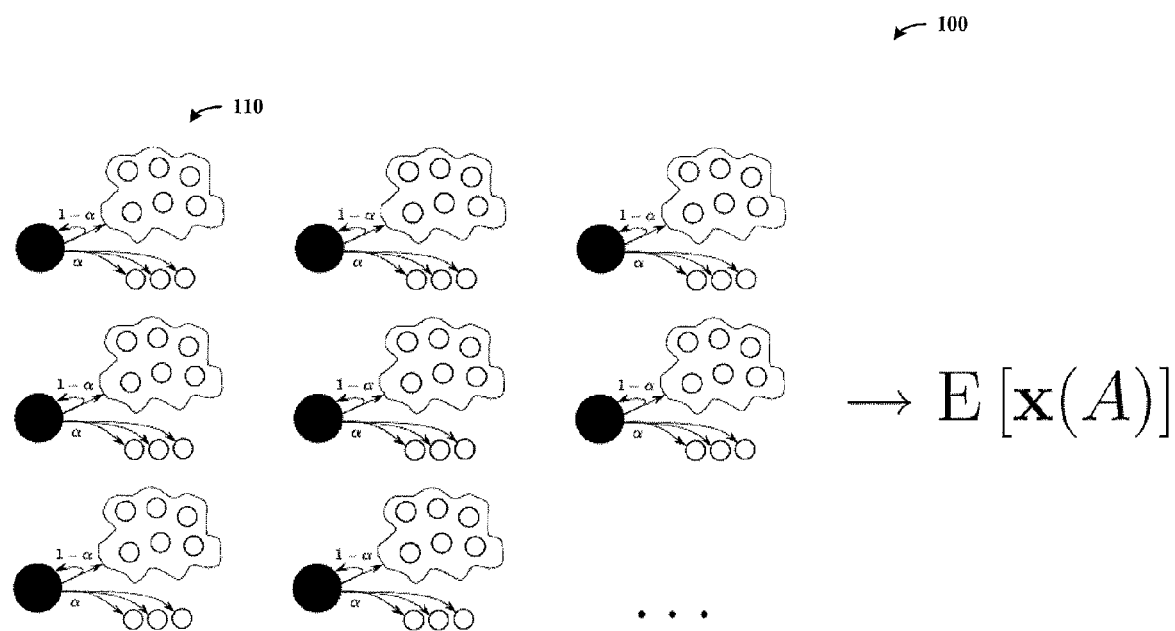
FIG. 1 shows a pictorial view of a ranking system and approach, consistent with an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be applicable to systems and methods of developing and using metrics for ranking the nodes of a graph, for example a web graph applicable to ranking pages of search engine results. In particular, the present invention is directed to using non-deterministic (i.e., random or stochastic) variables to induce a non-deterministic solution vector for ranking the nodes of a graph.

In certain embodiments, aspects of the present invention may be used to synthesize the statistics of a random or stochastic vector x that solves the linear system: $(1-\alpha P)x=(1-\alpha)v$, where P is the properly adjusted transition probability matrix of a Markov chain on the underlying graph G, the vector v is a probability distribution on the nodes of G, and the parameter $\alpha$ is a random or stochastic variable supported on the interval [0,1]. In a web surfing example, $\alpha$ may be used to describe the probability of certain web surfer behavior (e.g., that a surfer follows the links of a web page uniformly at random or jumps to a different page according to a given probability distribution over web pages). Due to its influence on these random jumps, the value $\alpha$ is often called the teleportation parameter. The statistics of the solution vector x include its expectation, standard deviation, covariance matrix, probability density functions, and cumulative distribution functions. The precise synthesis of these statistics is, in general, dependent on the particular application. For example, the covariance matrix may be effective in identifying spam pages on the World Wide Web.

When cc is a constant, this system is the standard page rank model, and the solution x is the page rank vector originally proposed by Brin and Page. Page rank models and search engine environments are described, for example, in U.S. Pat. No. 7,216,123 and in U.S. Pat. Pub. 2008/0010281, each of which is incorporated into this document. Such previously-described page rank models and variations thereof have assumed a deterministic solution vector x. In connection with the present invention, it has been found that a stochastic interpretation of the page rank model can significantly advantage the metric. As such, aspects of the present invention uncover and make use of characteristics of the graph G not recognized or appreciated in the original page rank model.

Embodiments of the present invention may be suitably implemented in applications that incorporate a finite number of random or stochastic variables into a graph theoretical model, such as a page rank model, to induce a random or stochastic solution vector. As will be appreciated, systems and methods of the present invention are suitable for, and may be applied to, any large database of linked or related information. For example, in certain embodiments, introducing random or stochastic variables in accordance with the present invention is applied to (i) web page rankings, (ii) spam detection, (iii) gene classification, (iv) protein classification, (v) graph isomorphism classification, and so forth. In each particular context, the various statistics of the solution may provide different amounts of useful information. For example, the qualitative features of a probability density function of a web page rank may reveal patterns in user behavior, which may in turn suggest advertising strategies for the owner of that page. In the context of gene classification, the standard deviation may be useful in identifying genes that are sensitive to perturbations in the Markov model.

Certain embodiments of the present invention provide features for inclusions in a web ranking framework. The commercial goal of web rankings is to provide the most relevant search results to a user query. This is generally accomplished by incorporating as much uncorrelated information from the graph as possible, where improvements on the order of tenths of a percent are substantial.

Aspects of the present invention make use of multiple algorithms to compute the desired statistics, which are applicable to various applications. The metrics developed and used in various aspects of the present invention are suitable for computation in a large-scale setting, such as encountered with internet-based search engines. In particular applications, ranking metrics may be developed from the statistics based on random or stochastic variables, and may be compared with existing deterministic ranking metrics.

Aspects of the present invention are based on a recognition of errors in the random surfer model commonly utilized by a deterministic page ranking when it is interpreted over a set of "surfers." In certain embodiments, the present invention considers the influence of a population of random surfers on the page rank solution vector. Accordingly, each member of the population has an individualized teleportation parameter chosen from a probability distribution, and, consequently the ranking vector is non-deterministic. As such, a contribution to the solution vector is introduced that corresponds to each random surfer to create a global metric that amalgamates this information. In other words, aspects of the present invention involve including a non-deterministic variable to model the individual users' behaviors.

In particular embodiments, four algorithms are used for computing the statistics of the random ranking vector based respectively on: (i) random sampling, (ii) paths along the links of the underlying graph, (iii) a spectral expansion of the random ranking vector, and (iv) quadrature formulas; these approaches are further discussed herein. In connection with the present invention, it has also been discovered that use of a non-deterministic ranking vector produces similar rankings to the deterministic analogue, but the standard deviation gives uncorrelated information (under a Kendall-tau metric) with a myriad of potential uses. Applications of this model include search engines, genetic networks and web spam.

Various other embodiments of the present invention are directed to one or more implementations as described in the attached Appendix to Constantine et al., "SPECTRAL METHODS FOR PARAMETERIZED MATRIX EQUATIONS", which is also published by Cornell University in its arxiv.org publication, and which is fully incorporated herein by reference. These embodiments may further be implemented in connection with one or more example embodiments described herein.

In connection with other example embodiments, a modification of a ranking approach for a Markov chain transforms any input Markov chain into an irreducible, periodic chain with a unique stationary distribution. Elements of this unique stationary distribution give the importance of the nodes in the state space of the input Markov chain. Related aspects of the invention are directed to addressing errors in random surfer models, such as those disclosed in L. Page, S. Brin, R. Motwani, and T. Winograd, *The PageRank citation ranking: Bringing order to the web*, Technical Report 1999-66, Stanford University (November 1999). Accordingly, certain aspects of the invention are also directed to implementation relating to the page ranking algorithm described in this reference and further in S. Brin and L. Page, *The anatomy of a large-scale hypertextual Web search engine*, Proceedings of the seventh international conference on World Wide Web 7: 107-117, Section 2.1.1 (1998), which is also fully incorporated herein by reference. Hereinafter, reference to a "page rank" value may refer to one or more page ranking approaches, such as those described in the above references to Page et al and to which the trademark name "PageRank" (to Google, Inc.) can be applied.

With probability $\alpha$, the surfer follows the links of a web page uniformly at random. With probability $1-\alpha$, the surfer jumps to a different page according to a given probability distribution over web pages. Due to its influence on these random jumps, the value α can be referred to as the teleportation parameter. Thus, the page rank value for a web graph depends on two quantities: the parameter α and the given distribution over the pages. The effect of both of these quantities on the mathematics of the page rank vector are fairly well understood, but the choice of α is not well justified in the context of the random surfer model. For a survey of the mathematical properties, see P. Berkhin, *A survey on PageRank computing*, Internet Mathematics, 2(1):73-120 (2005), A. Langville and C. Meyer, *Google's PageRank and Beyond: The Science of Search Engine Rankings*, Princeton University Press (2006), and the references therein. Existing page rank calculations use a single value of α. In the literature, two choices stand out: α=0.5 (L. Katz, *A new status index derived from sociometric analysis*, Psychometrika, 18(1):39-43 (March 1953), K. Avrachenkov, N. Litvak, and K. S. Pham, *Distribution of PageRank mass among principle components of the web*, In Anthony Bonato and Fan Chung Graham, editors, Proceedings of the 5th Workshop on Algorithms and Models for the Web Graph (WAW2007), volume 4863 of Lecture Notes in Computer Science, pages 16-28, Springer (2007), P. Chen, H. Xie, S. Maslov, and S. Redner, *Finding scientific gems with Google's PageRank algorithm*, Journal of Informetrics, 1(1):8-15 (January 2007)), and α=0.$8 (L. Page, S. Brin, R. Motwani, and T. Winograd, *The PageRank citation ranking: Bringing order to the web*, Technical Report 1999-66, Stanford University (November 1999), M. Najork, H. Zaragoza, and M. Taylor, *Hits on the web: how does it compare?*, In Proceedings of the 30th annual international ACM SIGIR conference on Research and Development in information retrieval (SIGIR2007), pages 471-478, New York, N.Y., USA (2007) ACM). These choices are discussed below.

Empirically measured browsing patterns on the web show that individual users, unsurprisingly, have different browsing behavior. See, e.g., B. Huberman, P. L. T. Pirolli, J. Pitkow, and R. Lukose, *Strong regularities in World Wide Web surfing*, Science, 280(5360):95-97 (1998), and R. White and S. Drucker, *Investigating behavioral variability in web search*," In Proceedings of the 16th international conference on the World Wide Web (WWW2007), pages 21-30, New York, N.Y., USA (2007) ACM Press. If we assume that each user has his own probability $\alpha_i$ of teleporting, then the page rank model suggests we should set $$\alpha = \frac{1}{N}\sum_{i=1}^{N}\alpha_i,$$

i.e. the mean of these values. More generally, if A is a random variable with a density function encoding the distribution of teleportation parameters amongst multiple (perhaps infinite) surfers, then the page rank model suggests α=E[A] where E[•] is the expectation operator.

The error in page rank is that using α=E[A] still does not yield the correct page rank vector in light of the surfer values $\alpha_i$, as relating to a single value of α that condenses all surfers into a single über-surfer. Embodiments of the present invention are directed to giving a small vote to the page rank vector $x(\alpha_i)$ corresponding to each random surfer, and creating a global metric that amalgamates this information. In other words, the random surfer model is used with "α=A," where A is a random variable modeling the users' individual behaviors.

FIG. 1 gives a pictorial view of a ranking system and approach 100 in accordance with an example embodiment. If A is a random variable, then the page rank vector x(A) is a random vector, and a new ranking measure is synthesized from its statistics. Hereinafter, this measure is referred to as the random a page rank (RAPr). Relative to the above-referenced page rank model, the RAPr model assumes that each surfer (110, by way of example) is unique with a different value of α, which is represented as a random variable A (whereas the page rank model assumes a single random surfer representing the expected user). If the function x(•) gives the page rank vector for a deterministic or random α or A, respectively, the expected page rank is computed given the distribution for A.

In what follows, aspects of the RAPr model (and embodiments involving the RAPr model) are explained and analyzed. This model has strong connections with other path damping approaches to page rank computation. Exemplary choices are described for the ranking model that may be employed in connection with embodiments as described herein. Given the row-oriented adjacency matrix of a web graph $$W_{i,j} = \begin{cases} 1 & \text{page } i \text{ links to page } j \\ 0 & \text{otherwise.} \end{cases} \quad (1)$$

let P be a column-stochastic transition matrix for W, $$P_{j,i}=\text{probability of transitioning from node i to node j.} \quad (2)$$

so that $e^T P = e^T$. This transformation assumes that dangling nodes have been corrected in some manner, and uses the page rank model described in P. Boldi, R. Posenato, M. Santini, and S. Vigna, *Traps and pitfalls of topic-biased PageRank*, in WAW 2006 Fourth Workshop on Algorithms and Models for the Web-Graph, LNCS, Springer-Verlag (2007). The expression (1−α) is used as the teleportation probability and v is used as the teleportation or personalization distribution. To avoid theoretical difficulties, the page rank model requires $0 \le \alpha < 1$ and $v_i > 0$. Under these definitions, then, the page rank vector x(α) is the unique positive eigenvector with $\|x(\alpha)\|_1 = 1$ satisfying $$(\alpha P+(1-\alpha)ve^T)x(\alpha)=x(\alpha). \quad (3)$$

Equivalently, the vector x(α) satisfies the linear system. A. Arasu, J. Novak, A. Tomkins, and J. Tomlin, *PageRank computation and the structure of the web: Experiments and algorithms*, In Proceedings of the 11th international conference on the World Wide Web (2002), and G. Del Corso, A. Gulli, and F. Romani, *Fast PageRank computation via a sparse linear system*, Internet Mathematics, 2(3):251-273 (2005).

$$(I-\alpha P)x(\alpha)=(1-\alpha)v. \quad (4)$$

The page rank vector x(E[A]) does not incorporate the surfing behavior of all users; thus, the vector E[x(A)] is used instead. Because the page rank vector is a non-linear function of α, it is not expected that E[x(A)]=x(E[A]). The following represents reasonable distributions of A:

$$x(E[A])\approx E[x(A)]. \quad (5)$$

Despite this similarity, moving from the deterministic x(α) to the random x(A) yields more information. For a given page, its "page rank" is now a random variable.

Figure 2A:
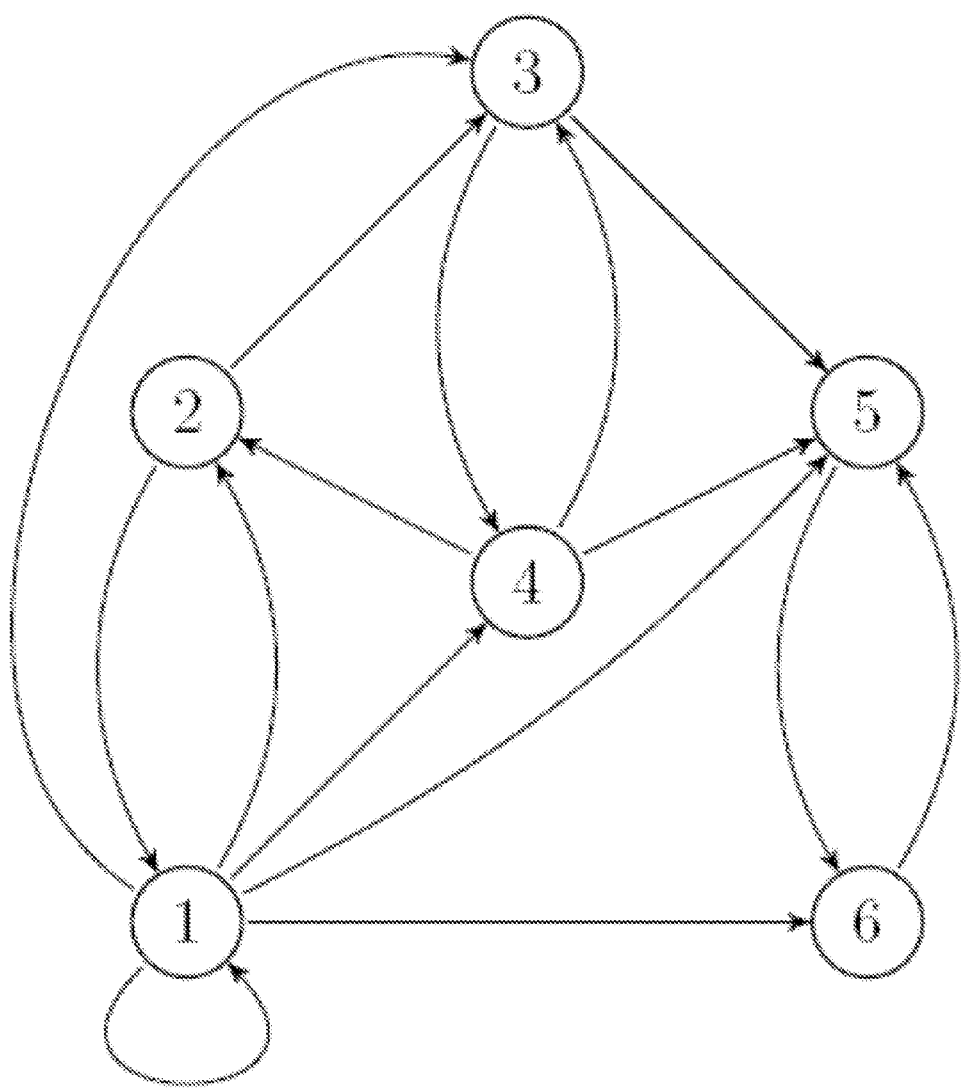
FIG. 2A and FIG. 2B respectively show a small webgraph and probability density functions for page rank random variables, in connection with other example embodiments of the present invention.
Figure 2B:
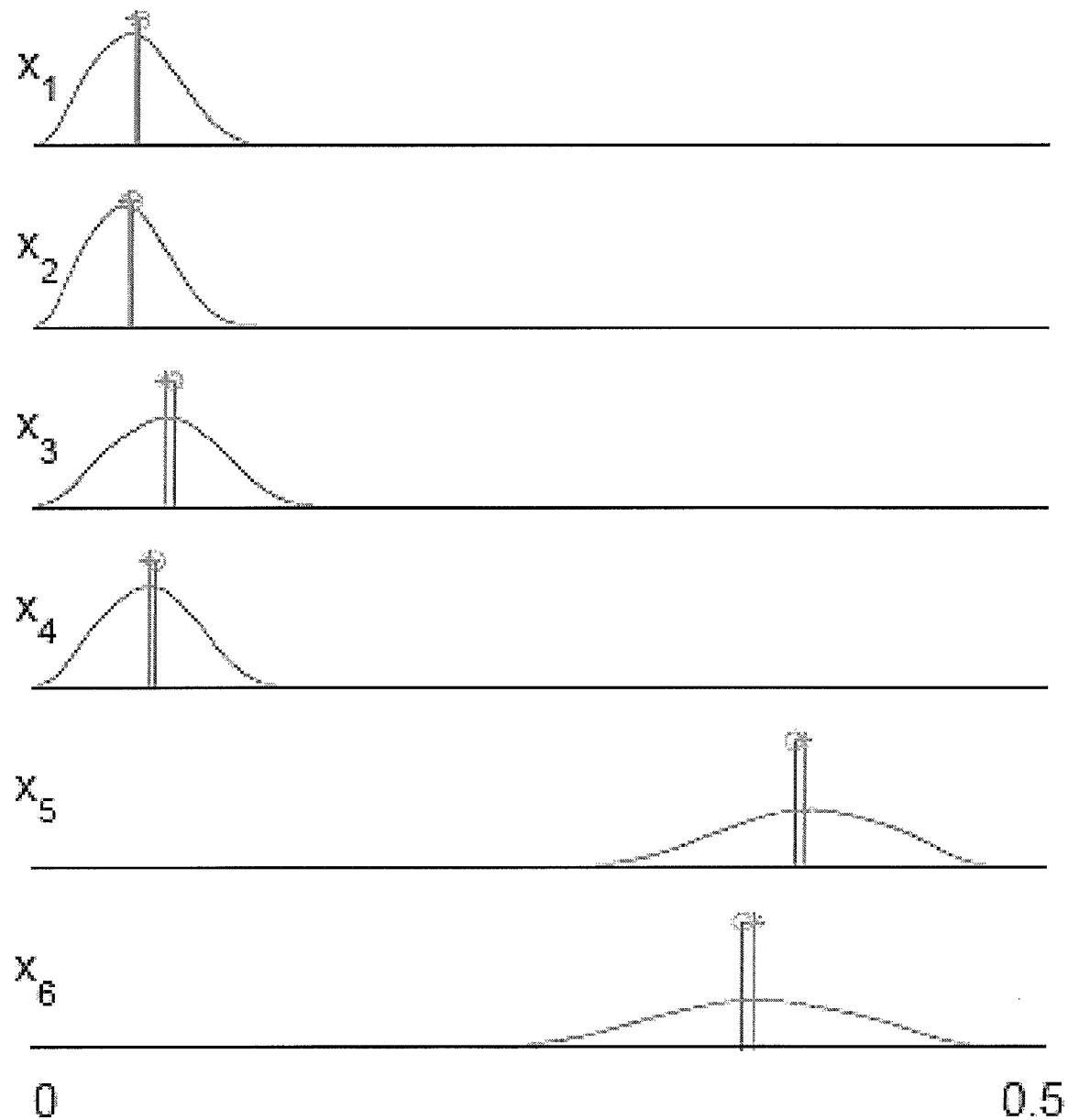

FIG. 2A and FIG. 2B respectively show a small webgraph and probability density functions for page rank random variables, in connection with other example embodiments. In this example, pages 5 and 6 (represented as $x_5$ and $x_6$) have the highest variance (widest density function). These pages are traps from which the random surfer cannot leave. In this plot, A~Beta(2, 16, 0, 1). In FIG. 2B, the circle stems show the page rank value for α=E[A]=0.85 whereas the star stems show the expectation according to the page rank density.

The standard deviation of the random variables can be used to help "quantify the uncertainty" in the page rank value. The standard deviation is a measure of the variability in the page rank induced by the variability in A. For the webgraph in FIG. 2A, the standard deviation vector is given in the table below.

$$Std[x(A)] = \begin{bmatrix} 0.021332 \\ 0.019883 \\ 0.026146 \\ 0.023193 \\ 0.041233 \\ 0.049304 \end{bmatrix}$$

This vector shows that $x_5$ and $x_6$ have the highest standard deviation. In a traditional page rank context, these pages are both in a sink-component and accumulate rank from the largest connected component ($x_1$, $x_2$, and $x_4$). A high standard deviation signals that the rank of these pages is "more likely" to change for different realizations of A.

Another quantity derived in accordance with various embodiments described herein is the correlation coefficient between ranks. The correlation coefficient between two ranks $x_i$ and $x_j$ provides a measure of how $x_i$ will vary as $x_j$ varies due to different realizations of A. If the correlation between $x_i$ and $x_j$ is positive then an increase in $x_i$ from separate realizations of A implies that $x_j$ will also increase. If the correlation is negative, then an increase in $x_i$ implies a decrease in $x_j$ due to the variation in A. Below, example correlation coefficients between all pages are shown.

$$\begin{bmatrix} 1.000000 & 0.999996 & 0.998844 & 0.999211 & -0.999951 & -0.999373 \\ 0.999996 & 1.000000 & 0.998764 & 0.999149 & -0.999936 & -0.999313 \\ 0.998844 & 0.998764 & 1.000000 & 0.999963 & -0.999261 & -0.999920 \\ 0.999211 & 0.999149 & 0.999963 & 1.000000 & -0.999550 & -0.999989 \\ -0.999951 & -0.999936 & -0.999261 & -0.999550 & 1.000000 & 0.999667 \\ -0.999373 & -0.999313 & -0.999920 & -0.999989 & 0.999667 & 1.000000 \end{bmatrix}$$

The correlation structure shows that there are effectively two groups of pages, ($x_1$, $x_2$, $x_3$, $x_4$) and ($x_5$, $x_6$).

Thus far, certain exemplary useful quantities that can be derived from the RAPr model have been shown, yet many problem-dependent uses are available for these quantities. Generally, it has been discovered that the standard deviation vector is uncorrelated (in a Kendall-τ sense) with the page rank vector itself. Because pages with a high standard deviation have highly variable page rank values, the standard deviation vector can be used as an input to a machine learning framework for web search or web page categorization.

The correlation structure between the random ranks indicates that some of the pages form natural groups. In some embodiments, connections between negatively correlated ranks are used to glean information from an underlying graph for various applications, such as for spam detection.

Another example embodiment is directed to local site analysis. On certain websites, the entire graph structure is available. Further, site usage logs contain information that is used to generate the vector v based on incoming searches. Those same logs also contain the information necessary to estimate the distribution of A. With the RAPr formulation, the extra information is then available to help the site owner understand how people use the site.

In connection with various implementations, the page rank model can be used for network and graph analysis. It has been used to find graph cuts (R. Andersen, F. Chung, and K. Lang, *Local graph partitioning using PageRank vectors*, In Proceedings of the 47th Annual IEEE Symposium on Foundations of Computer Science (2006)), infer missing values on a partially labeled graph (D. Zhou, J. Huang, and B. Schölkopf, *Learning from labeled and unlabeled data on a directed graph*, In ICML '05: Proceedings of the 22nd International Conference on Machine Learning, pages 1036-1043, New York, N.Y., USA (2005) ACM Press), find interesting genes (J. Morrison, R. Breitling, D. Higham, and D. Gilbert, *GeneRank: using search engine technology for the analysis of microarray experiments*, BMC Bioinformatics, 6(1):233 (2005)), and help match graph structures in protein networks (R. Singh, J. Xu, and B. Berger, *Pairwise global alignment of protein interaction networks by matching neighborhood topology*, In Proceedings of the 11th Annual International Conference on Research in Computational Molecular Biology (RECOMB), volume 4453 of Lecture Notes in Computer Science, pages 16-31, Oakland, Calif. (2007) Springer Berlin/Heidelberg). In all of these cases, the random surfer model does not directly apply. Each paper picks a particular value for α and computes a rank from that value. In connection with various embodiments, including those described in connection with RAPr, each of these contexts can be processed to interpret a random parameter substitution. Rather than reporting just a single number, the standard deviation can be used as natural error bounds representing the uncertainty in the resulting ranks.

In connection with various implementations, the following state model may be applied to the page ranking approach such as the RAPr approach described above. Given an random variable A with finite variance distributed within the interval [0.1], the random alpha page rank is the vector x(A) that satisfies $$(I-AP)x(A)=(1-A)v. \quad (9)$$

where I, P, and v are as in equation 4.

The first order of business for RAPr is to choose the distribution of A. For some applications, the information for the empirical distribution of A is present in the logs from the surfer behavior studies discussed above, and in other applications, an empirical distribution is used from other sources.

Figure 3:
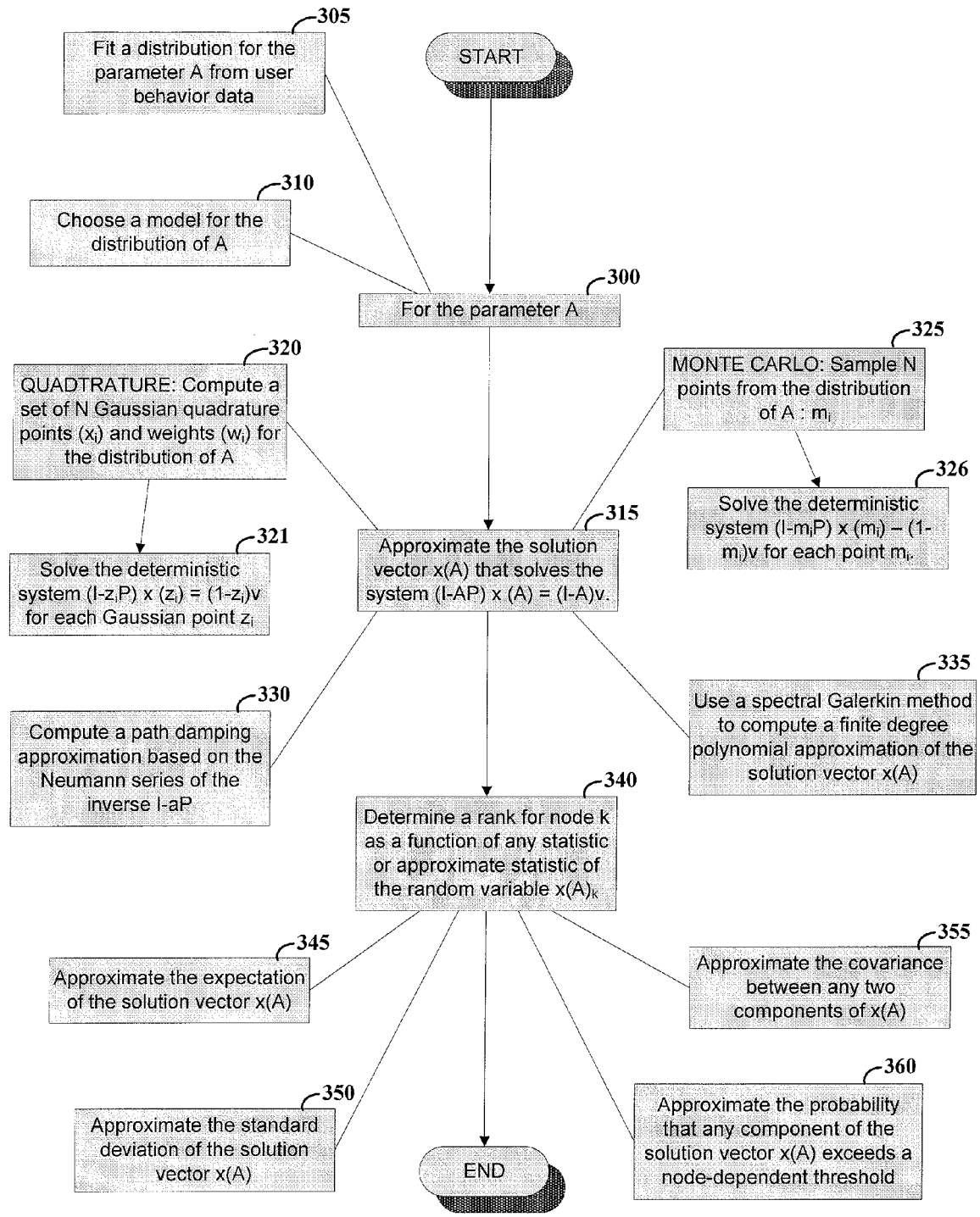
FIG. 3 shows a flow diagram for a ranking approach, in accordance with other example embodiments of the present invention.

FIG. 3 shows a flow diagram for a ranking approach with various exemplary implementations for different steps, in accordance with other example embodiments of the present invention. The steps shown in the flow diagram relate to processes and functions as may be implemented with other discussion herein. As such, detailed explanation as to various nomenclature is omitted for brevity. The steps begin at block 300, where a parameter A is chosen, with exemplary sources for the parameter characterized in blocks 305 and 310, respectively by fitting a distribution for the parameter A from user behavior data, and by choosing a model for the distribution of A.

At block 315, the solution vector x(A) is approximated, where the vector solves the system (I−AP)×(A)=(I−A)v. This approximation may be carried out in different manners such as described herein, respectively involving algorithms used to compute statistics of an approximation (e.g., RAPr). These algorithms include an approach based on Gaussian quadrature (320), a Monte Carlo method (325), an algorithm based on a truncated path-damping expansion (330), and a spectral stochastic Galerkin method (335) based on the polynomial chaos expansion. Where Gaussian quadrature is used, a set of N Gaussian quadrature points and weights for the distribution of A is computed at block 320. The deterministic system $(I-z_iP)\times(z_i)=(1-z_i)v$ is computed at block 321 for each Gaussian point $z_i$. For the Monte Carlo method, at block 325, N points are sampled from the distribution of A : $m_i$. At block 326, the deterministic system $(I-m_iP)\times(m_i)-(1-m_i)v$ is solved for each point $m_i$. In the path damping approximation, such an approximation is computed based upon the Neumann series of the inverse I−aP at block 330. For the Galerkin method, a finite degree polynomial approximation of the solution vector x(A) is computed at block 335. Solving a deterministic PageRank system may imply computing an approximate solution by any standard algorithm, for example the Richardson method, the Gauss-Seidel method, and the power method.

After the solution vector is approximated at block 315 using one of the methods described in blocks 320-335, a rank for node k is determined at block 340, as a function of any statistic (or approximate statistic) of the random variable $x(A)_k$. Blocks 345-360 show four approaches for this rank determination by way of example. At block 345, the expectation of the solution vector x(A) is approximated. At block 350, the standard deviation of the solution vector x(A) is approximated. The covariance between any two components of x(A) is approximated at block 355. At block 360, the probability that any component of the solution vector x(A) exceeds a node-dependent threshold is approximated. These and other approaches may be used in accordance with one or more embodiments as described herein.

Figure 4:
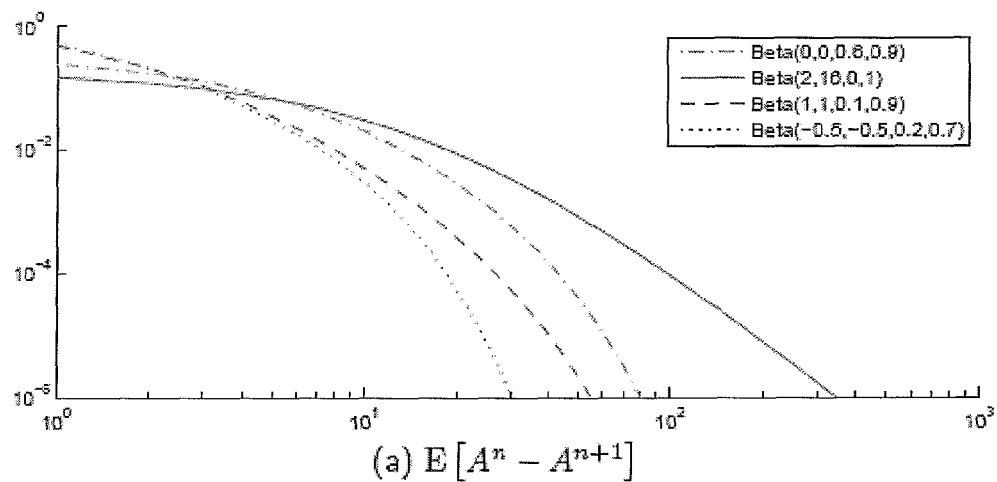
FIG. 4A-FIG. 4F show path damping views of a random-alpha page rank (RAPr) approach, according to another example embodiment of the present invention.
Figure 4:
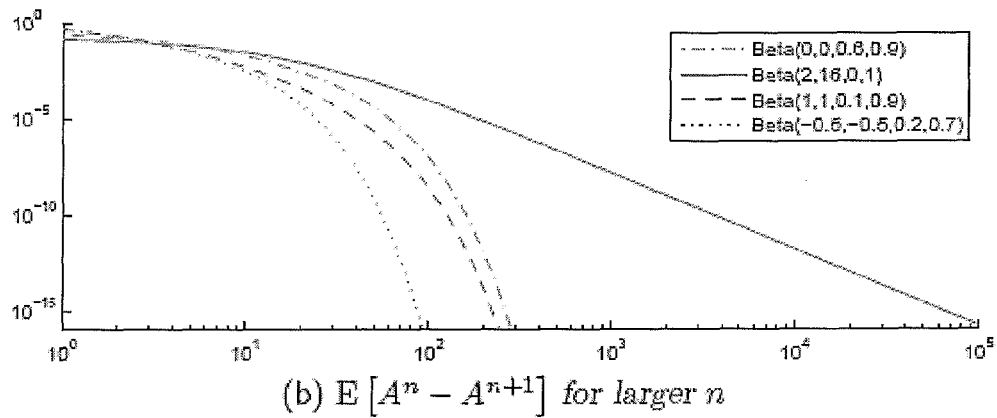
Figure 4:
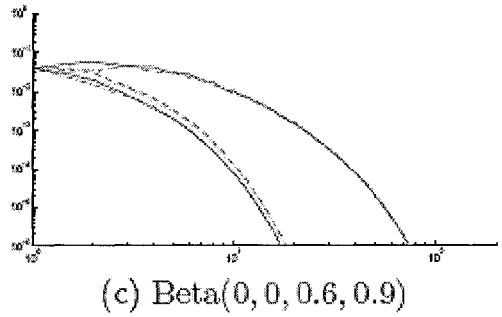
Figure 4:
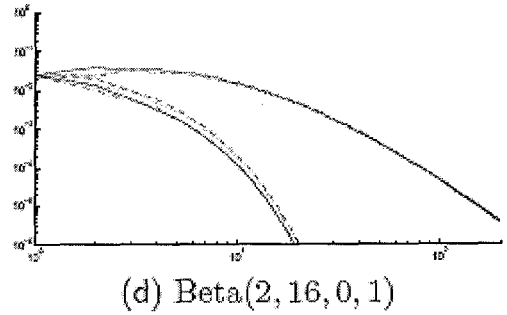
Figure 4:
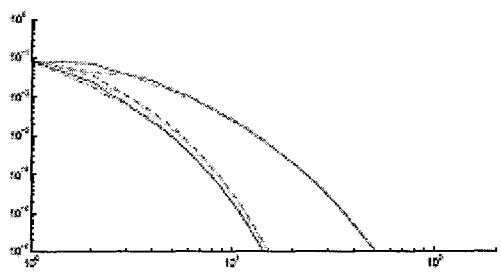
Figure 4:
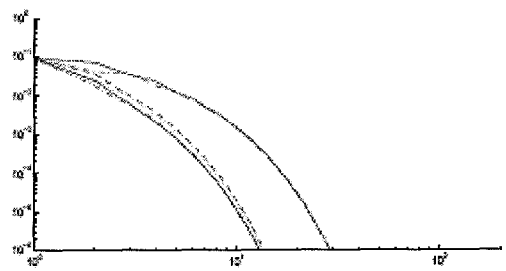

FIG. 4A-FIG. 4F show plots for a path damping view of RAPr, in connection with various example embodiments. The following discussion characterizes exemplary details on the algorithmic implications of the path damping view, with the plots showing exemplary covariance structure as described herein. FIG. 4A and FIG. 4B show the path damping coefficients for the distributions as shown. The following FIG. 4C-FIG. 4F have lines that show $E[A^n-A^{n+1}]P^n v$ that may be applicable to the pages represented in FIG. 2B, with the two lines at the right of each these plots corresponding to pages $x_5$ and $x_6$.

To derive RAPr, the deterministic teleportation coefficient α is replaced with a random variable A. This modification converts each page rank value into a random variable with various statistics. The expectation statistic generalizes other page rank variants including the "TotalRank" algorithm, which averages page ranks over all possible α's (see, e.g., P. Boldi, *TotalRank: ranking without damping*, International World Wide Web Conference, pages 898-899 (2005)). Empirically, the standard deviation vector is uncorrelated with the page rank vector under the Kendall τ correlation coefficient. This holds for a wide variety of graphs, including a large (3 billion link) graph, and a gene association graph. Thus the standard deviation of RAPr represents a useful metric for an importance ranking on a graph.

The following discussion describes four methods for computing the approximate statistics of RAPr, in connection with various embodiments. In connection with these methods, four algorithms are used to compute the statistics of RAPr: (i) a Monte Carlo method, (ii) an algorithm based on a truncated path-damping expansion, (iii) a spectral stochastic Galerkin method based on the polynomial chaos expansion, and (iv) an approach based on Gaussian quadrature. Algorithms (iii) and (iv) give theoretically identical results, but both methods show differences with inexact computation. For each algorithm, some runtime and/or accuracy bounds are established with mild restrictions on the parameters of A~Beta(α, b, l, r).

In connection with an example embodiment, a Monte Carlo approach is used as follows to compute the expectations, standard deviations, and density functions of RAPr. First, A realizations of A are generated from a chosen distribution, and then solve each resulting page rank problem. With the N different realizations of $x(\alpha_i)$, i=1, ..., N, unbiased estimates are computed for E[x(A)] and Std[x(A)] with the formulas $$E[x(A)] \approx \frac{1}{M}\sum_{i=1}^{M} x(\alpha_i) \equiv \hat{\mu}_x,$$

$$Std[x(A)] \approx \sqrt{\frac{1}{M-1}\sum_{i=1}^{M}(x(A_i)-\hat{\mu}_x)^2}$$

e.g., as described in S. Asmussen and P. Glynn, *Stochastic Simulation: Algorithms and Analysis*, volume 57 of Stochastic Modelling and Applied Probability, Springer (2007).

For various embodiments, path damping algorithms are used as follows for page ranking with an RAPr approach using a large set of functions that generate path damping coefficients. This approach is used to compute E[x(A)] and Std [x(A)], using the Neumann series from theorem 2, $$E[x(A)] = \sum_{l=0}^{\infty} E[A^l - A^{l+1}]P^l v. \tag{27}$$

This series is truncated to a finite value A, and an algorithm for E[x(A)] immediately follows, $$E[x(A)] \approx x^{(N)} = \sum_{l=0}^{N} E[A^l - A^{l+1}]P^l v + \left(1 - \sum_{l=0}^{N} E[A^l - A^{l+1}]\right)P^{N+1}. \tag{28}$$

The final term in this summation ensures that $e^T x^{N,pd}=1$.

To compute Std [x(A)] using the path damping equations E[x(A)·x(A)] is computed and then $$Std[x(A)] = \sqrt{E[x(A)\cdot x(A)] - (E[x(A)]\cdot E[x(A)])}$$

is computed. Based on the Neumann expansion again, $$E[x(A)\cdot x(A)] = \sum_{i=0}^{\infty}\sum_{j=0}^{\infty} E\left[\begin{array}{c}A^{i+j}-2A^{i+j+1}+\\ A^{i+j+2}\end{array}\right](P^i v)\cdot(P^j v). \tag{29}$$

Again, this series is truncated to a common term in both i and j $$E[x(A)^2] \approx s^{(N)} = \sum_{i,j}^{N} E[A^{i+j} - 2A^{i+j+1} + A^{i+j+2}](P^i v) \cdot (P^j v). \quad (30)$$

Another approach is directed to using polynomial chaos, in which the (n×N+1) matrix is defined $X=[x_0 \ldots x_N]$ and the Kronecker notation $vec(X)=(x_0^T, \ldots, x_N^T)^T$ is employed, and a linear system is written for the PCE coefficients as $$(I_N \otimes I - T_N \otimes P)vec(X) = (I_N - T_N)e_1 \otimes v \quad (51)$$

where $I_N$ is an (N+1×N+1) identity matrix and $T_N$ is an (N×N) tridiagonal matrix defined by $$T_N(k,k-1) = A_1 v_{k-1}^{(a,b)}, \; T_N(k,k) = A_0 + A_1 \gamma_k^{(a,b)}, \; T_N(k,k+1) = A_1 \mu_{k+1}^{(a,b)}, \quad (52)$$

for k=0 . . . , N. It is worth noting $$T_N = A_0 I_N + A_1 \tilde{T}_N \quad (53)$$

where $\tilde{T}_N$ is the transpose of the matrix of recurrence coefficients defining the normalized orthogonal polynomials for the probability density of A, i.e.

$$\tilde{T}_N = \begin{bmatrix} \gamma_0^{(a,b)} & v_1^{(a,b)} & & \\ \mu_0^{(a,b)} & \gamma_1^{(a,b)} & v_2^{(a,b)} & \\ & \ddots & \ddots & \ddots \\ & & \mu_{N-1}^{(a,b)} & \gamma_N^{(a,b)} \end{bmatrix} \quad (54)$$

As relevant to other implementations, $\{\Phi_j\}$ can be defined on the interval [1, r], so $T_N = \tilde{T}_N$.

Equation 51 leaves N+1 coupled linear systems to solve for $\{x_j\}$. Note that the dimension of this larger system is N+1 times the dimension of P. Once the PCE coefficients $\{x_j\}$ are solved, the mean of the page rank vector is estimated as $$E[x(A)] = E\left[\sum_{j=0}^{N} x_j \Psi_j\right] = x_0 \underbrace{E[\Psi_0]}_{=1} + \sum_{j=0}^{N} x_j \underbrace{E[\Psi_i]}_{=0} = x_0.$$

The (n×n) approximate covariance matrix Cov[x(A)] with entries defined as $Cov[x(A)]_{ij} = Cov[x_i(A), x_j(A)]$ is then computed as $$Cov[x(A)] = E[xx^T] - E[x]E[x]^T$$

$$= E\left[\left(\sum_{j1=0}^{N} x_{j1} \Psi_{j1}\right)\left(\sum_{j2=0}^{N} x_{j2} \Psi_{j2}\right)^T\right] - x_0 x_0^T$$

$$= \underbrace{\sum_{j=0}^{N} x_j x_j^T E[\Psi_j^2]}_{by\; orthogonality} - x_0 x_0^T$$

$$= \sum_{j=1}^{N} x_j x_j^T h_j^{(a,b)}$$

To compute the standard deviation, the square root is taken of the diagonal elements of Cov[x(A)], i.e. $Std[x(A)] = \sqrt{diag(Cov[x(A)])}$.

The PCE in equation 41 provides an approximation of x(A) that is an explicit function of ξ. To generate an approximate probability density function $\rho x_i$ for the rank $x_i$, a sample can be taken from the distribution of ξ and to evaluate a polynomial approximation based on the PCE coefficients at each sample. This produces a set of values suitable for a kernel density estimate of the $\rho x_i$.

A Gaussian quadrature rule is implemented in an approximation in connection with various embodiments. RAPr has one random parameter A≈Beta(a, b, 1, r), so one-dimensional interpolation and integration formulas are used to produce highly accurate statistics. In the following, interpolation and integration is reviewed and discussed in application to RAPr.

Using the mapping $x_i(\alpha):[1,r] \to \mathbb{R}$ as an explicit function of α, the probability density function of the random component $x_i(\alpha)$ is approximated using a kernel density estimate as in equation 26. In other words, with a function $x_i(\alpha)$, samples can be taken from the distribution of α, each sample is plugged into $x_i(\alpha)$, and the density estimator is applied to the resulting set of samples. An approximation of the mapping for $x_i(\alpha)$ is also constructed.

In one implementation, such an approximation is constructed using the standard N-point Lagrange interpolation, $$x(\alpha) \approx \sum_{i=1}^{N} x(\alpha_i) l_i(\alpha) \equiv \mathcal{L}_N(\alpha) \quad (59)$$

where the N distinct $\alpha_i \in [1, r]$ and $$l_i(\alpha) = \prod_{j=1, j \neq i} \frac{\alpha - \alpha_j}{\alpha_i - \alpha_j} \quad (60)$$

is the Lagrange basis polynomial. $\mathcal{L} v(\alpha)$ is a polynomial of degree N−1, with the polynomial of degree N−1 constructed on N points being unique.

What remains is the choice of $\{\alpha_i\}$. In general, for some choices—such as equidistant $\{\alpha_i\}$—the interpolant may diverge from the actual function of interest as N→∞. However, if the points are selected to be the zeros of certain orthogonal polynomials, then the interpolant will converge point-wise for well-behaved functions (E. Isaacson and H. B. Keller, *Analysis of Numerical Methods*, Dover (1994)). This choice of $\{\alpha_i\}$ has other distinct applications as discussed below.

The statistics that are computed are integrals in the probability space, considering that for A≈Beta(a, b, 1, r), $$E[x(A)] = \int_1^r x(\zeta) \rho_{Beta(a,b)}(\zeta) d\zeta \equiv \mu_x$$

$$Cov[x(A)]_{ij} = \int_1^r x_i(\zeta) x_j(\zeta) \rho_{Beta(a,b)}(\zeta) d\zeta - \mu_{xi} \mu_{xj} \quad (61)$$

These are approximated with numerical quadrature formulas, just like deterministic integrals.

The Gauss quadrature formulas choose the points $\{z_i\}$ to enhance (e.g., optimize) the degree of exactness. In particular, a N-point Gauss formula $\{z_i^G, w_i^G\}$, i=1, . . . , N has degree of exactness 2N−1. Also, the points lie within the interval [1, r] and the weights are all positive (W. Gautschi, *Orthogonal Polynomials: Computation and Approximation*, Numerical Mathematics and Scientific Computation, Oxford University Press (2004)).

With the points and weights of the Gauss quadrature formula, we first solve N deterministic page rank problems $$(I - z_i^G P) x_i = (1 - z_i^G) v \quad (64)$$

using methods described herein. Then, the statistics of RAPr are computed with the quadrature formulas $$E[x(A)] \approx \sum_{i=1}^{N} x_i w_i^G$$

$$\text{Cov}[x(A)] \approx \sum_{i=1}^{N} x_i x_i^T w_i^G - \left(\sum_{i=1}^{N} x_i w_i^G\right)\left(\sum_{i=1}^{N} x_i w_i^G\right)^T$$

Also, with the solutions $x_i$ computed at the Gauss quadrature points, equation 59 can be used to construct approximate response functions Of x(A) in order to generate approximate probability density functions.

The above-discussed approaches are applicable to a variety of implementations and applications. Other variances are used in connection with the same. In one variant embodiment, the standard deviation or covariance information to improve some aspects of web search or other applications as used in connection with ranking approaches. Such approaches include, for example, the "GeneRank" approach described in J. Morrison, R. Breitling, D. Higham, and D. Gilbert, *GeneRank: using search engine technology for the analysis of microarray experiments*, BMC Bioinformatics, 6(1):233 (2005), for identifying important genes in a regulatory network, the "ProteinRank" approach described in V. Freschi, *Protein function prediction from interaction networks using a random walk ranking algorithm*, In Proceedings of the 7th IEEE International Conference on Bioinformatics and Bioengineering (BIBE 2007) pages 42-48. IEEE (October 2007), for identifying important proteins, and the "IsoRank" approach R. Singh, J. Xu, and B. Berger, *Pairwise global alignment of protein interaction networks by matching neighborhood topology*, In Proceedings of the 11th Annual International Conference on Research in Computational Molecular Biology (RECOMB), volume 4453 of Lecture Notes in Computer Science, pages 16-31, Oakland, Calif. (2007) Springer Berlin/Heidelberg, for identifying important edges in a graph-isomorphism like-problem. One or more embodiments may be implemented in connection with these ranking approaches.

In other applications, quadrature variants such as Gauss-Radau rules, Clenshaw-Curtis, and Fejér rules (W. Gautschi, *Orthogonal Polynomials: Computation and Approximation*, Numerical Mathematics and Scientific Computation, Oxford University Press (2004)) are used in connection with the above quadrature interpolations. Many applications are directed to characterizing the parametric function x(A). Using these approaches, a quadrature setting can be determined in terms of computational cost and accuracy for RAPr.

Further applications are directed to finding the random variable A when formulated to correctly model empirically measured path damping coefficients, which leads to additional insight into the behavior of surfers on the web.

Other applications are directed to modification of algebraic functions in this paper involving systems of the form $$(I_N \otimes I - T_N \otimes P)x = (I_N - T_N)e_1 \otimes v \quad (86)$$

which is a page rank system with Et replaced by the matrix $T_N$. The vector x is related to a rational function applied to a matrix parameter. Examining this matrix system, other generalizations of page rank and some connections with the derivative of page rank with respect to a can be determined.

While the present invention has been described in the above description, in the underlying provisional application, including Appendices A and B that form part of the provisional application (Appendix B also published as "Using Polynomial Chaos to Compute the Influence of Multiple Random Surfers in the PageRank Model" WAW 2007, LNCS 4863, pp. 82-95, *Springer-Verlag Berlin Heidelberg* (2007)), the referenced and incorporated papers (including the Appendix filed with this document and its corresponding publication), and in the claims that follow, those skilled in the art will recognize that changes may be made thereto without departing from the spirit and scope of the present invention. Such changes may include, for example, the implementation of one or more approaches as described in the provisional application, the attached Appendix, including approaches described in the references listed therein. Other changes may include applying one or more example embodiments as described in connection with a page rank and as may be applicable to the "PageRank" (trademark) algorithm in the Page et al. references cited herein, with different algorithms and/or different approaches that may involve other algorithms or with or without such a page rank algorithm or aspects thereof. These and other approaches as described in the contemplated claims below characterize aspects of the present invention.

What is claimed is:

1. A circuit-based method for ranking nodes of a graph, comprising:
    providing a vector, in the form of a signal to a circuit, as a function of a set of random parameters wherein the vector represents a probability distribution on the nodes of the graph and can solve a linear system;
    using a probability matrix function based upon a Markov chain on the graph and relative to the nodes of the graph to assess statistics of the vector for solving a probability-based system that is based on the vector and based on a non-deterministic variable; and
    ranking the nodes of the graph based upon the assessed statistics of the vector.

2. The method of claim 1, wherein the statistics of the vector include at least one of the following: a function of finite moments of the vector, covariance matrix, a probability density function, and cumulative distribution function, the function of finite moments of the vector including at least one of expectation and standard deviation, wherein the non-deterministic variable is used for ranking the nodes of the graph.

3. The method of claim 1, wherein the probability matrix function includes a linear system partly defined as a function of an adjusted transition probability matrix represented based on the nodes on the graph.

4. The method of claim 3, wherein the linear system is further defined as a function of a probability distribution on the nodes of the graph.

5. The method of claim 3, wherein the linear system is further defined as a function of a random variable.

6. The method of claim 1, wherein the nodes of the graph are indicative of parameters relating to web pages.

7. The method of claim 1, wherein the nodes of the graph are indicative of parameters relating to web-based spam data sets.

8. The method of claim 1, wherein the nodes of the graph are indicative of parameters relating to genes.

9. The method of claim 1, wherein the nodes of the graph are indicative of parameters relating to proteins.

10. The method of claim 1, wherein the nodes of the graph are indicative of parameters relating to graph isomorphisms.

11. The method of claim 1, wherein the system is a linear system, and the vector is used to solve the system based on a stochastic interpretation of at least part of the linear system.

12. The method of claim 1, wherein the steps involve modeling with the vector as a random variable distributed according to user behavior for multiple users.

13. The method of claim 1, wherein the steps involve quantifying a degree of uncertainty in the vector using at least one of a Monte Carlo sampling algorithm, an algorithm that uses truncated polynomial chaos expansion of the random parameters, an algorithm based on path damping coefficients, and a quadrature approximation.

14. The method of claim 1, wherein the steps involve computing the expectation and standard deviation of the nodes.

15. The method of claim 1, wherein the vector models an underlying user population associated with the nodes.

16. The method of claim 15, wherein the steps involve quantifying an importance of one of the nodes as a function of the vector.

17. The method of claim 1, wherein the steps involve using a standard deviation associated with the graph to generate rankings that are uncorrelated with the vector.

18. The method of claim 17, wherein the uncorrelated rankings are used for a machine learning framework to generate a search ranking function.

19. The method of claim 1, wherein the steps involve algorithmically computing the statistics of the vector based respectively on at least one of the following: (i) random sampling, (ii) paths along the links of the underlying graph, (iii) a spectral expansion of the vector, and (iv) quadrature formulas.

20. The method of claim 1, wherein the steps of providing a vector and using a probability matrix function to assess the statistics of the vector include executing stored computer executable code with a computer to perform the steps.

21. The method of claim 1, further including storing, in a data storage medium, results based on the assessed statistics.

22. The method of claim 1, further including storing, in a data storage medium, parameters indicative of the random parameters.

23. The method of claim 1, further including using a data storage medium for accessing data useful for the steps of providing a vector and using a probability matrix function to assess the statistics of the vector.

24. The method of claim 1, wherein
providing a vector includes providing a non-deterministic vector for solving a linear system, and
the linear system is based upon an adjusted transition probability matrix of a Markov chain on the graph, a random variable, and a probability distribution on the nodes of the graph.

25. The method of claim 1, wherein the vector is characterized in that it can solve the probability-based system in which a vector x that solves a linear system $(1-\alpha P)x = (1-\alpha)v$, in which
P is the probability matrix function,
v is the vector, and
the parameter $\alpha$ is the non-deterministic variable.

26. The method of claim 1, wherein the vector for solving the probability-based system is a stochastic vector x that solves a linear system $(1-\alpha P)x = (1-\alpha)v$, in which
P is the probability matrix function,
the vector v is a function of the probability matrix function, and
the parameter $\alpha$ is a constant.

27. A computer-based system for ranking nodes of a graph, the system comprising
a computer circuit configured with software to
provide a vector as a function of a set of random parameters wherein the vector represents a probability distribution on the nodes of the graph and can solve a linear system, and
use a probability matrix function based upon a Markov chain on the graph and relative to the nodes of the graph to assess statistics of the vector for solving a probability-based system that is based on the vector and based on a non-deterministic variable; and
rank the nodes of the graph based upon the assessed statistics of the vector.

28. The method of claim 25, in which the parameter a describes the probability of a web surfer that at least one of:
follows the links of a web page uniformly at random, and
jumps to a different page according to a given probability distribution over web pages.

29. The system of claim 27, wherein
the computer circuit is configured and arranged to provide the vector by providing a non-deterministic vector that solves a linear system, and
the linear system is based upon an adjusted transition probability matrix of a Markov chain on the graph, a random variable, and a probability distribution on the nodes of the graph.

30. The system of claim 27, wherein the computer circuit is configured and arranged to provide the vector that solves the probability-based system by providing a vector x that solves a linear system $(1-\alpha P)x = (1-\alpha)v$, in which
P is the probability matrix function,
the vector is v, and
the parameter $\alpha$ is the non-deterministic variable.

* * * * *